United States Patent
Ha et al.

(10) Patent No.: US 12,369,560 B2
(45) Date of Patent: Jul. 29, 2025

(54) CHEMICAL COMPOSITION AND METHOD OF USING AN ANTIMICROBIAL ODOR CONTROL ADDITIVE FOR PET LITTERS

(71) Applicant: MICROBAN PRODUCTS COMPANY, Huntersville, NC (US)

(72) Inventors: Mai Le Phuong Ha, Cornelius, NC (US); Ivan Wei Kang Ong, Charlotte, NC (US)

(73) Assignee: Microban Products Company, Huntersville, NC (US)

( * ) Notice: Subject to any disclaimer, the term of this patent is extended or adjusted under 35 U.S.C. 154(b) by 0 days.

(21) Appl. No.: 18/072,960

(22) Filed: Dec. 1, 2022

(65) Prior Publication Data

US 2023/0172154 A1 Jun. 8, 2023

Related U.S. Application Data

(60) Provisional application No. 63/286,064, filed on Dec. 5, 2021.

(51) Int. Cl.
| | | |
|---|---|---|
| *C11D 3/00* | (2006.01) | |
| *A01K 1/015* | (2006.01) | |
| *C11D 3/20* | (2006.01) | |

(52) U.S. Cl.
CPC .......... *A01K 1/0155* (2013.01); *C11D 3/2065* (2013.01); *C11D 3/2075* (2013.01)

(58) Field of Classification Search
CPC ... A01K 1/0155; C11D 3/2065; C11D 3/2075
USPC ...................................................... 502/400
See application file for complete search history.

(56) References Cited

U.S. PATENT DOCUMENTS

| | | |
|---|---|---|
| 3,921,581 A | 11/1975 | Brewer |
| 5,526,771 A | 6/1996 | Ito |
| 8,852,565 B2 * | 10/2014 | Finke .................... D06M 23/12 512/26 |
| 9,149,019 B2 | 10/2015 | Everhart |
| 2014/0271757 A1 | 9/2014 | Agrawal et al. |
| 2017/0304182 A1 | 10/2017 | Kadir et al. |
| 2018/0184663 A1 | 7/2018 | Johns |
| 2019/0124921 A1 * | 5/2019 | Koehl .................... A01N 37/02 |
| 2023/0383093 A1 | 11/2023 | Ha |

FOREIGN PATENT DOCUMENTS

| | | |
|---|---|---|
| BR | PI-1009652 B1 | 7/2020 |
| CN | 107182808 A | 9/2017 |

OTHER PUBLICATIONS

International Search Report and Written Opinion (ISR and WO) issued for PCT/US2022/051643 dated Apr. 4, 2023 (10 pages).
International Preliminary Report on Patentability (IPRP) issued for PCT International Application No. PCT/US2022/051643, mailed Jun. 20, 2024 (9 pages).
Restriction Requirement issued for U.S. Appl. No. 18/073,105, mailed Dec. 23, 2024 (6 pages).
Japanese Office Action (OA) for corresponding Patent Application No. 2024-533331; mailed on Apr. 30, 2025; 2 pages.
Non-Final Office Action (NFOA) issued for U.S. Appl. No. 18/073,105; mailed on Feb. 25, 2025 (13 pages).

* cited by examiner

*Primary Examiner* — James E McDonough
(74) *Attorney, Agent, or Firm* — Shumaker, Loop & Kendrick, LLP

(57) ABSTRACT

The invention relates to a composition and method for controlling odor in pet litters. The composition includes a benzoic acid, a Generally Regarded as Safe acid, and a wetting liquid. This composition is capable of acting both as an antimicrobial and as an odor controlling preservative in pet litters. The benzoic acid and the liquid can be mixed together, or added to the litter materials, to combat the malodors created by the pet litter content.

8 Claims, No Drawings

CHEMICAL COMPOSITION AND METHOD OF USING AN ANTIMICROBIAL ODOR CONTROL ADDITIVE FOR PET LITTERS

CROSS-REFERENCE TO RELATED APPLICATIONS

This application claims priority from U.S. Provisional Patent Application No. 63/286,064, filed on Dec. 5, 2021, in the United States Patent and Trademark Office. The disclosure is incorporated herein by reference in its entirety.

FIELD OF THE INVENTION

The present invention relates to a composition and method for controlling odor created by pet litters, more particularly a composition and method of using a dual action antimicrobial odor control additive for litter materials.

BACKGROUND OF THE INVENTION

For many pets raised indoors, a litter box is used for feces and urine collection. The main issue with a litter box is the odors that are produced from the waste. Besides the inherent odors, litter boxes become breeding grounds for bacteria which also generate malodors through their metabolism processes. To reduce the odors, homeowners currently use substances like baking soda to help absorb the odor, different fragrances to mask the malodors, and antimicrobials—like octhilinone (OIT) and benzisothiazolinone (BIT)—to combat the odors generated by bacteria. While baking soda can mitigate acidic odors like sour milks or cheese, it has very little effect on fecal and urine odors. Furthermore, current antimicrobials used in this application are toxic and can cause skin sensitization.

To address the continuous foul odor and bacterial growth that litter boxes create, a better and safer odor control solution is desired by pet owners. The present invention provides a method that addresses and solves these needs.

SUMMARY OF THE INVENTION

The present invention relates to a pet litter product and a chemical composition for use with pet litter as well as methods for making, using and/or testing. In the present invention, benzoic acid, a "Generally Regarded As Safe" (GRAS) acid, is used as an antimicrobial odor controlling additive in litter materials. Benzoic acid has the ability to act both as an antimicrobial and as an odor absorption preservative. As an acid, benzoic acid directly binds to odors from waste materials. As an antimicrobial, benzoic acid prevents bacterial growth, hence bacterial generated odors. Unlike benzoic acid, present technologies used to mask pet litter odors have no ability to capture ammonia-based odor chemically, use different toxic antimicrobials, and must use two separate additives for antimicrobial and odor absorption. By background, the current traditional approach to controlling odors in pet litter is typically by deploying an antimicrobial(s) to control microbial growth in the pet litter in the hope that less active microbes translates to less malodors produced through microbial action.

Furthermore, benzoic acid contains low water solubility and thus the reaction between the acid and litter materials is very limited. Using benzoic acid does not alter the surface properties of the litter and therefore does not affect the absorption properties of the litter materials.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

DESCRIPTION OF THE PREFERRED EMBODIMENTS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in," "at," and/or "on," unless the context clearly indicates otherwise. The phrase "in one embodiment," as used herein does not necessarily refer to the same embodiment, although it may.

Various embodiments are set forth herein including a composition and methods for testing and controlling the odor created by pet litters.

In an embodiment of the invention, a product for use as a pet litter is provided. The product prevents bacterial growth and controls odor that is created after an animal deposits feces and/or urine in pet litter.

The product of the invention comprises a litter material treated or combined with a GRAS acid. The litter material can be comprised of various ingredients that may include, but are not limited to, various types of clays, plant materials (may include corn, pine sawdust and others), fragrances, mineral oil and other materials.

The acronym "GRAS" is used by federal regulatory agencies to refer to substances that are considered to be "Generally Recognized As Safe" when used in accordance with good manufacturing practices. For example, such regulations include 21 CFR 182, 21 CFR 184, and 21 CFR 186. Examples of GRAS components or compounds include, but are not limited to, food preservatives. As a category, food preservatives may be suitable for use in the composition of the present invention as they are classified as minimum risk pesticides while providing antimicrobial efficacy. Examples of GRAS acids are organic acids. GRAS acids include, but are not limited to, benzoic acid, propionic acid, sorbic acid, citric acid, lactic acid, ascorbic acid, acetic acid, erythorbic acid, fumaric acid, malic acid, glycolic acid, derivatives thereof and a combination thereof.

Preferably in the present invention, the GRAS acid is benzoic acid. However, benzoic acid may be used in combination with one or more GRAS acids. Benzoic acid is used as a dual action antimicrobial and odor absorption additive in the litter material. As an acid, benzoic acid directly binds to inherent odors from waste materials. As an antimicrobial, benzoic acid prevents bacterial growth, and thus bacterial generated odors. The benzoic acid may be in a form of a powder or a liquid.

A liquid may be used in combination with the GRAS acid and/or the litter material. The liquid may be selected from the group consisting of glycol, mineral oil, water, alcohol, and a combination thereof. The GRAS acid and the liquid may be present in a ratio of GRAS acid to alcohol in a range of 1:100 to 100:1. The liquid may contain or include one or more alcohols such as an aromatic alcohol. The aromatic alcohol is preferably a phenylpropanoid family derivative alcohol. The phenylpropanoid derivative alcohol may be, for example, 3-phenyl propanol.

It has unexpectedly been found that there is a synergistic antimicrobial effect between a GRAS antimicrobial/preservative and 3-phenyl propanol. The synergistic effect allows the use of the antimicrobial at lower levels and in materials that otherwise are not feasible.

In a preferred aspect of the invention, a combination of benzoic acid and phenyl propanol is used. A ratio of benzoic acid to 3-phenyl propanol may be in a range of 1:100 to 100:1, preferably 10:1 to 1:10.

The benzoic acid may be present in an amount of 0.01 weight % to 3 weight %, preferably in a range of 0.05 weight % to 0.5 weight %, wherein the weight percentage is based on the weight of the litter material. The 3-phenyl propanol may be present in an amount of 0.01 weight % to 3 weight %, preferably in a range of 0.05 weight % to 0.5 weight %, wherein the weight percentage is based on the weight of the litter material.

In an aspect of the invention, a chemical composition is provided. The chemical composition comprises a GRAS acid and a liquid. Preferably, the GRAS acid is benzoic acid. The benzoic acid may be used in combination with one or more other GRAS acids. The liquid may be selected from the group consisting of glycol, mineral oil, water, alcohol, and a combination thereof. Preferably, the alcohol includes an aromatic alcohol, and the aromatic alcohol is phenyl propanol. The GRAS acid and the liquid may be present in a ratio of in a range of 1:100 to 100:1. The chemical composition is capable of acting as both an antimicrobial and as an odor controlling preservative for litter material.

In an embodiment of the invention, a method of making an odor controlling chemical composition for pet litter is provided. The method comprises of mixing benzoic acid (preferably in powder form) with the litter material (preferably in granulate form) and using a liquid to aid in the deposit of acid uniformly on the granulate. Examples of liquids include, but are not limited to, glycol, mineral oil, water, and/or alcohol. The benzoic acid can be dispersed/dissolved in the liquid and added to litter material at once, or each can be added separately at different appropriate points in the process by spraying, tumbling, or mixing the chemical composition with the litter material.

Methods of testing include, but are not limited to, Test method ATCC TM211-2021. ATCC TM211-2021 is a test method to measure the reduction of bacterial odor on antibacterial treated products. This method was developed as a direct means of quantifying odor generation due to microbial action. The test utilizes a visually apparent detection method, Drager Columns, to measure ammonia generated through bacterial activity. The advantages of ATCC TM211-2021 include the ability to directly and quantitatively measure the ammonia evolved without depending on an organism's survival as an indicator of odor inhibition, a quick turnaround in results, and is inexpensive and reproducible. Quantitative microbial testing may also be carried out by ASTM E2180 method.

The method of testing using ATCC TM211-2021 include adding 1 gram of litter to a 5 ml volumetric flask. Then 1 ml inoculum with nutrient and bacteria is added to the litter and incubated at 36° Celsius for 18 hours to allow bacteria to generate ammonia. Alternatively, modification can be made to test conditions such as incubation can occur at room temperature for an extended time to simulate the litter's real-life use conditions. The Drager Column is inserted into the test vessel at the end of the incubation period for ammonia quantification.

A unique aspect of this invention is that a combination of benzoic acid with a suitable adjuvant provides equal effectiveness compared to a more potent and toxic isothiazalinone-based package.

Example 1

Benzoic acid and phenyl propanol were individually added to kitty litter. The samples were subjected to a modified AATCC 211-2021 test method and were inoculated at room temperature with synthetic urine, using *Proteus vulgaris* as the challenged organism. Ammonia Drager tubes were inserted after 7 days of incubation and ammonia levels were read after 1.5 hours, the time when untreated samples reached maximum levels. As the data in Table 1 below demonstrates, the amount of ammonia evolved in the benzoic acid and 3-phenyl propanol treated kitty litter is significantly lower than the untreated control kitty litter. Additionally, the combination of benzoic acid and 3-phenyl propanol generates relatively the same amount of ammonia as the more toxic currently in-use isothiazolone based treated kitty litter.

TABLE 1

Ammonia generated after 7 days challenged with *P. vulgaris* and synthetic urine.

| No. | Sample description | NH3 ppm - 1.5 h |
|-----|---------------------|-----------------|
| 1 | Current isothiazolone treated kitty litter, replicate 1 | <20 |
| 2 | Current isothiazolone treated kitty litter, replicate 2 | <20 |
| 3 | Benzoic acid + 3-phenyl propanol treated kitty litter, replicate 1 | <20 |
| 4 | Benzoic acid + 3-phenyl propanol treated kitty litter, replicate 2 | 50 |
| 5 | Untreated control kitty litter, replicate 1 | 1500 |
| 6 | Untreated control kitty litter, replicate 2 | 1500 |

Quantitative bacteria tests were done using ASTM E 2180 test method using *Proteus vulgaris* as challenged organism. Nutrient was modified with synthetic urine and incubation occurred at room temperature for 14 days. The data in Table 2 below demonstrates the viable organism count for the benzoic acid and 3-phenyl propanol treated kitty litter is repeatedly significantly lower than the untreated control litter. Furthermore, the log reduction of the benzoic acid and 3-phenyl propanol treated kitty litter ranges between 4.2-4.8, which demonstrates equal effectiveness to the more toxic isothiazolone treated kitty litter.

TABLE 2

Quantitative bacterial test results using ASTM E 2180 after 14 days challenged with *P. vulgaris* and synthetic urine.

| No. | Sample description | Viable organisms | Log reduction |
|---|---|---|---|
|  | Inoculum | 310,000 |  |
| 1 | Current isothiazolone treated kitty litter, replicate 1 | 200 | 4.5 |
| 2 | Current isothiazolone treated kitty litter, replicate 2 | <100 | 4.8 |
| 3 | Current isothiazolone treated kitty litter, replicate 3 | <100 | 4.8 |
| 4 | Benzoic acid + 3-phenyl propanol treated kitty litter, replicate 1 | 400 | 4.2 |
| 5 | Benzoic acid + 3-phenyl propanol treated kitty litter, replicate 2 | 100 | 4.8 |
| 6 | Benzoic acid + 3-phenyl propanol treated kitty litter, replicate 3 | 100 | 4.8 |
| 7 | Untreated control kitty litter, replicate 1 | 9,000,000 |  |
| 8 | Untreated control kitty litter, replicate 2 | 3,000,000 |  |
| 9 | Untreated control kitty litter, replicate 3 | 13,000,000 |  |

Example 2

TABLE 3

GRAS Kitty Litter Treatment Formulation 1

| Substance | Weight % |
|---|---|
| Benzoic acid | 13.3 |
| Phenyl propanol | 26.7 |
| Propylene glycol | 60 |

GRAS kitty litter treatment formulation 1 was added to kitty litter and the samples were subjected to a modified AATCC 211-2021 test method, which inoculated at room temperature with synthetic urine, using *P. vulgaris* as the challenged organism. Ammonia Drager tubes were inserted after 7 and 14 days of incubation and ammonia levels were read after 2 hours, which is the time when untreated samples reached maximum levels.

TABLE 4

Ammonia generated after 7 and 14 days challenged with *P. vulgaris* and synthetic urine.

| No. | Sample description | 7 days NH3 ppm - 2 hours | 14 days NH3 ppm - 2 hours |
|---|---|---|---|
| 1 | Current isothiazolone treated kitty litter | <20 | <20 |
| 2 | Kitty litter treated with Formulation 1 | <20 | 20 |
| 6 | Untreated control kitty litter | 1500 | 1500 |

As demonstrated in Table 4, the kitty litter treated with Formulation 1 was found to be as effective in reducing the amount of ammonia evolved as the more potent and toxic isothiazalinone-based treated litter after 7 and 14 days of incubation. Additionally, the amount of ammonia evolved is significantly lower in the litter treated with Formulation 1 as compared to the untreated control kitty litter.

Quantitative bacteria tests were done using ASTM E 2180 test method. Nutrient was modified with synthetic urine and incubation occurred at room temperature for 14 days. The data in Table 5 indicates that the viable organisms count for the kitty litter treated with Formulation 1 is significantly lower than the untreated control litter, with a log reduction range between 2.1-2.9. This demonstrates the invention's ability to inhibit microbial growth and supports the antibacterial claim.

TABLE 5

Quantitative bacterial test results using ASTM E 2180 after 14 days challenged with *P. vulgaris* and synthetic urine.

| No. | Sample description | Viable organisms | Log reduction |
|---|---|---|---|
|  | Inoculum | 380,000 |  |
| 1 | Kitty litter treated with Formulation 1, replicate 1 | 100 | 2.9 |
| 2 | Kitty litter treated with Formulation 1, replicate 2 | 600 | 2.1 |
| 3 | Kitty litter treated with Formulation 1, replicate 3 | 500 | 2.2 |
| 4 | Untreated control kitty litter, replicate 1 | 110,000 |  |
| 5 | Untreated control kitty litter, replicate 2 | 100,000 |  |
| 6 | Untreated control kitty litter, replicate 3 | 50,000 |  |

Example 3

TABLE 6

GRAS Kitty Litter Treatment Formulation 2

| Substance | Weight % |
|---|---|
| Benzoic acid | 6.6 |
| Phenyl propanol | 26.7 |
| Mineral oil | 66.7 |

Quantitative bacteria tests were done using ASTM E 2180 test method. Nutrient was modified with synthetic urine and incubation occurred at room temperature for 14 days. As demonstrated in Table 7 below, the viable organisms count for the kitty litter treated with Formulation 2 is significantly lower than the untreated control litter, with a log reduction range between 4.6-5.2. This demonstrates the antimicrobial odor control effect of Formulation 2 of the invention.

TABLE 7

Quantitative bacterial test results using ASTM E 2180 after 14 days challenged with *P. vulgaris* and synthetic urine.

| No. | Sample description | Viable organisms | Log reduction |
|---|---|---|---|
|  | Inoculum | 520,000 |  |
| 1 | Kitty litter treated with Formulation 2, replicate 1 | 200 | 5.2 |
| 2 | Kitty litter treated with Formulation 2, replicate 2 | 800 | 4.6 |
| 3 | Kitty litter treated with Formulation 2, replicate 3 | 200 | 5.2 |
| 4 | Untreated control kitty litter, replicate 1 | 26,000,000 |  |
| 5 | Untreated control kitty litter, replicate 2 | 25,000,000 |  |
| 6 | Untreated control kitty litter, replicate 3 | 55,000,000 |  |

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A pet litter product having antimicrobial and/or odor control properties consisting of:
   a litter material treated with a combination of active agents, wherein the combination of active agents is benzoic acid present in an amount of 0.01 weight % to 3 weight % based on the weight of the litter material and 3-phenyl propanol present in an amount of 0.01 weight % to 3 weight % based on the weight of the litter material; and
   an optional carrier;
   wherein a ratio of the benzoic acid to the 3-phenyl propanol is present in a range of 1:2 to 1:4;
   wherein the combination of active agents imparts antimicrobial and/or odor control properties; and
   wherein the litter material is a solid.

2. The pet litter product according to claim 1, wherein the optional carrier is glycol, mineral oil, water, or a combination thereof.

3. The pet litter product according to claim 2, wherein the optional carrier aids in uniform deposition of the benzoic acid on the litter material.

4. The pet litter product according to claim 1, wherein the benzoic acid is present in a range of 0.05 weight % to 0.5 weight % based on the weight of the litter material.

5. The pet litter product according to claim 1, wherein the 3-phenyl propanol is present in a range of 0.05 weight % to 0.5 weight % based on the weight of the litter material.

6. The pet litter product according to claim 1, wherein the pet litter product reduces bacterial growth by a log reduction ranging from 2.1 to 4.8 after 14 days.

7. The pet litter product according to claim 1, wherein the pet litter product reduces bacterial growth by a log reduction ranging from 4.2 to 4.8 after 14 days.

8. The pet litter product according to claim 1, wherein, after soiling of the pet litter product with urine, the pet litter product reduces ammonia generation compared to untreated pet litter products.

* * * * *